US008896437B2

(12) United States Patent
Sadana

(10) Patent No.: US 8,896,437 B2
(45) Date of Patent: Nov. 25, 2014

(54) ASSET-SPECIFIC EQUIPMENT HEALTH MONITORING (EHM) FOR INDUSTRIAL EQUIPMENT USING STANDARDIZED ASSET MODELS

(75) Inventor: Rajat Sadana, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 863 days.

(21) Appl. No.: 13/012,592

(22) Filed: Jan. 24, 2011

(65) Prior Publication Data

US 2012/0188073 A1    Jul. 26, 2012

(51) Int. Cl.
*F01D 21/00* (2006.01)
*F02C 9/00* (2006.01)

(52) U.S. Cl.
CPC ............. *F02C 9/00* (2013.01); *F05D 2260/80* (2013.01); *F05D 2270/70* (2013.01); *F01D 21/003* (2013.01)
USPC ..... 340/539.1; 340/3.42; 340/3.43; 340/3.44; 714/40; 714/735; 714/736; 714/737

(58) Field of Classification Search
CPC ........... G05B 23/0251; G05B 23/0205; G05B 23/0208; G05B 23/0213; G05B 23/0216; G05B 23/0248
USPC ............. 340/3.42–4.44; 714/40–57, 735–737
See application file for complete search history.

(56) References Cited

U.S. PATENT DOCUMENTS

| | | |
|---|---|---|
| 5,262,958 A | 11/1993 | Chui et al. |
| 5,381,697 A | 1/1995 | van der Pol |
| 5,594,180 A | 1/1997 | Carpenter et al. |
| 5,616,824 A | 4/1997 | Abdel-Malek et al. |
| 5,641,891 A | 6/1997 | Frankl et al. |
| 5,646,600 A | 7/1997 | Abdel-Malek et al. |
| 5,750,879 A | 5/1998 | Ohtsuka et al. |
| 5,966,674 A | 10/1999 | Crawford et al. |
| 6,208,943 B1 | 3/2001 | Randolph et al. |
| 6,408,676 B1 | 6/2002 | Stratton et al. |

(Continued)

FOREIGN PATENT DOCUMENTS

| | | |
|---|---|---|
| EP | 1 097 363 B1 | 12/2007 |
| WO | WO 03/090091 A1 | 10/2003 |

OTHER PUBLICATIONS

Y. Gao et al., "Wavelet-Based Pressure Analysis for Hydraulic Pump Health Diagnosis", Transactions of the ASAE, 2003, vol. 46(4), pp. 969-976.

(Continued)

*Primary Examiner* — Daniel Wu
*Assistant Examiner* — John Bamert

(57) ABSTRACT

A system includes at least one sensor and an equipment health monitoring (EHM) unit. The at least one sensor is configured to measure one or more characteristics of an asset, where the asset includes a piece of equipment. The EHM unit includes at least one sensor interface configured to receive at least one input signal associated with the asset from the sensor(s). The EHM unit also includes at least one processing unit operable to be pre-configured to identify a specified fault in the asset using the input signals and an asset-specific model that includes a combination of standard subsystem models. The EHM unit further includes at least one output interface configured to provide an indicator identifying the fault. The standard subsystem models could include standardized fault models configured to identify faults for standard assets.

20 Claims, 3 Drawing Sheets

(56) References Cited

U.S. PATENT DOCUMENTS

| | | | |
|---|---|---|---|
| 6,505,517 | B1 | 1/2003 | Eryurek et al. |
| 6,539,315 | B1 | 3/2003 | Adams et al. |
| 6,654,697 | B1 | 11/2003 | Eryurek et al. |
| 6,725,167 | B2 | 4/2004 | Grumstrup et al. |
| 6,727,725 | B2 | 4/2004 | Devaney et al. |
| 6,766,230 | B1* | 7/2004 | Rizzoni et al. .............. 701/32.9 |
| 6,941,785 | B2 | 9/2005 | Haynes et al. |
| 7,257,501 | B2 | 8/2007 | Zhan et al. |
| 7,274,995 | B2 | 9/2007 | Zhan et al. |
| 7,286,945 | B2 | 10/2007 | Zhan et al. |
| 7,421,374 | B2 | 9/2008 | Zhan et al. |
| 2003/0019297 | A1 | 1/2003 | Fiebelkorn et al. |
| 2003/0125906 | A1* | 7/2003 | Guaglardi .................... 702/182 |
| 2003/0216888 | A1 | 11/2003 | Ridolfo |
| 2004/0024568 | A1 | 2/2004 | Eryurek et al. |
| 2005/0104020 | A1 | 5/2005 | Zhan et al. |
| 2006/0025970 | A1 | 2/2006 | Wegerich |
| 2006/0071666 | A1 | 4/2006 | Unsworth et al. |
| 2007/0067678 | A1* | 3/2007 | Hosek et al. .................... 714/25 |
| 2007/0088534 | A1 | 4/2007 | MacArthur et al. |
| 2009/0204234 | A1* | 8/2009 | Sustaeta et al. ................. 700/29 |
| 2010/0030492 | A1 | 2/2010 | Kar et al. |
| 2010/0256932 | A1 | 10/2010 | Kar |
| 2010/0256953 | A1 | 10/2010 | Kar |
| 2011/0241888 | A1* | 10/2011 | Lu et al. ........................ 340/626 |
| 2012/0148382 | A1* | 6/2012 | Kruger et al. .................... 415/1 |

OTHER PUBLICATIONS

Simon G. Braun, "The Signature Analysis of Sonic Bearing Vibrations", IEEE Transactions on Sonics and Ultrasonics, vol. SU-27, No. 6, Nov. 1980, pp. 317-327.

Y. Gao et al., "Wavelet-Based Pressure Analysis for Hydraulic Pump Health Diagnosis", Transactions of the ASAE, vol. 46(4), pp. 969-976.

Horch A, "A Simple Method for Detection of Stiction in Control Valves", Control Engineering Practice, Pergamon Press, Oxford, GB, vol. 7, 1999, pp. 1221-1231.

Jiang Wanlu et al., "Applying Multiresolution Analysis for Processing of Hydraulic Pump Fault Signal", Fifth International Conference on Fluid Power Transmission and Control, Hangzhou, China, Apr. 2001, pp. 1-5.

Fujun He et al. "WPT-SVMs Based Approach for Fault Detection of Valves in Reciprocating Pumps", Proceedings of the American Control Conference, Anchorage, AK, May 8-10, 2002, pp. 4566-4570.

Mallat et al., "Singularity Detection and Processing with Wavelets", Mar. 1992, IEEE Transactions on Information Theory, vol. 38, No. 2, pp. 617-643.

Wang et al., "The Fault Character of the Motors Identified Based on Wavelet Transform", Nov. 2-5, 2003, Proceedings of the Second International Conference on Machine Learning and Cybernetics, Xi'an, pp. 2394-2398.

Gao et al., Support Vector Machines Based Apprroach for Fault Diagnosis of Valves in Reciprocating Pumps, 2002 IEEE Canadian Conference, pp. 1622-1627.

Ren et al. Fault Feature Extracting by Wavelet Transform for Control System Fault Detection and Diagnosis, 2000 IEEE, International Conference on Control Applications, pp. 485-489.

International Search Report for PCT/US2004/038766, issued by the International Searching Authority, mailed Apr. 14, 2005, by the European Patent Office, P.B. 5818 Patentlaan 2, NL-2280 HV Rijswijk.

Parvez S. et al., A Wavelet-Based Multi-Resolution PID Controller, 2003 IEEE Conference, Salt Lake City, UT, Oct. 2003, vol. 3 of 3, Conf. 38, pp. 1-5.

Zhihan Xu et al., Design of-Fault Detection and Isolation Via Wavelet Analysis and Neural Network, 2002 IEEE International Symposium, Vancouver, Canada, Oct. 2002, pp. 467-472.

Song Zhihuan et al., Adaptive Predictive Control Based on Wavelet Approximation Models, IEEE Conference, Beijing China, Oct. 1996, vol. 2, pp. 820-824.

Xiaohua Xia et al., Nonlinear Adaptive Predictive Control Based on Orthogonal Wavelet Networks, Shanghai China, Jun. 2002, vol. 1, pp. 305-311.

Nounou M N et al., Multiscaie Fuzzy System Identification, Journal of Process Control, Oxford, GB, vol. 15, No. 7, Oct. 2005, pp. 763-770.

Billings S A et al., Discrete Wavelet Models for Identification and Qualitative Analysis of Chaotic Systems, Singapore, SG, vol. 9, No. 7, Jul. 1999, pp. 1263-1284.

A. R. Mohanty, et al., "Fault Detection in a Multistage Gearbox by Demodulation of Motor Current Waveform", IEEE Transactions on Industrial Electronics, vol. 53, No. 4, Aug. 2006, p. 1285-1297.

Chinmaya Kar, et al., "Vibration and current transient monitoring for gearbox fault detection using multiresolution Fourier transform", Journal of Sound and Vibration 311 (2008), p. 109-132.

Chinmaya Kar, et al., "Monitoring gear vibrations through motor current signature analysis and wavelet transform", Mechanical System and Signal Processing 20 (2006), p. 158-187.

T. Lindth et al., "Automatic bearing fault classification combining statistical classification and fuzzy logic", 4th Nordic Workshop in Power & Industrial Electronics, Jun. 2004, 5 pages.

Laibin Zhang, et al., "Short-term fault prediction of mechanical rotating parts on the basis of fuzzy-grey optimising method", Mechanical Systems and Signal Processing 21 (2007), p. 856-865.

Michael J. Devaney, et al., "Detecting Motor Bearing Faults", IEEE Instrumentation & Measurements Magazine, Dec. 2004, p. 30-35 & 50.

Jason R. Stack, et al., "Fault Classification and Fault Signature Production for Rolling Element Bearings in Electric Machines", IEEE Transactions on Industry Applications, vol. 40, No. 6 May/Jun. 2004, p. 735-739.

Peter W. Tse, et al., "Wavelet Analysis and Envelope Detection for Rolling Element Bearing Fault Diagnosis—Their Effectiveness and Flexibilities", Journal of Vibration and Acoustics, Jul. 2001, vol. 123, p. 303-310.

V. Sugumaran, et al., "Automatic rule learning using decision tree for fuzzy classifier in fault diagnosis of roller bearing", Mechanical Systems and Signal Processing 21 (2007), p. 2237-2247.

Yaguo Lei, et al., "Fault diagnosis of rotating machinery based on multiple ANFIS combination with GA s", Mechanical Systems and Signal Processing 21 (2007), p. 2280-2294.

Jason R. Stack, et al., "An Amplitude Modulation Detector for Fault Diagnosis in Rolling Element Bearings", IEEE Transactions on Industrial Electronics, vol. 51, No. 5, Oct. 2004, p. 1097-1102.

Robert B. Randall, "State of the Art in Monitoring Rotating Machinery—Part 1", Sound and Vibration, Mar. 2004, p. 14-20.

Z.K. Peng, et al., "A comparison study of improved Hilbert-Huang transform and wavelet transform: Application to Fault diSgnoSis for rolling bearing", Mechanical Systems and Signal Processing 19 (2005), p. 974-988.

Xinsheng Lou, et al., "Bearing fault diagnosis based on wavelet transform and fuzzy inference", Mechanical Systems and Signal Processing 18 (2004) p. 1077-1095.

T.I. Liu, et al., "Detection of Roller Bearing Defects Using Expert System and Fuzzy Logic", Mechanical Systems and Signal Processing (1996) 10(5), p. 595-614.

Yaguo Lei, et al., "A new approach to intelligent fault diagnosis of rotating machinery", Expert Systems with Applictaions 35 (2008), p. 1593-1600.

Paula J. Dempsey, et al., "Tapered Roller Bearing Damage Detection Using Decision Fusion Analysis", NASA/TM-2006-21430, Jul. 2006, 23 pages.

* cited by examiner

ASSET-SPECIFIC EQUIPMENT HEALTH MONITORING (EHM) FOR INDUSTRIAL EQUIPMENT USING STANDARDIZED ASSET MODELS

TECHNICAL FIELD

This disclosure relates generally to industrial equipment. More specifically, this disclosure relates to asset-specific equipment health monitoring (EHM) for industrial equipment using standardized asset models.

BACKGROUND

A wide variety of industrial equipment is used in virtually every industry around the world. For example, rotating equipment, such as gearboxes, are widely used in virtually any industry. As specific examples, gearboxes are often used in speed reduction and power transmission applications. A gearbox can be a single-stage gearbox or a multi-stage gearbox. A gearbox also typically includes external gearing, internal gearing, and rack and pinion gearing.

Because of this wide use, many industries are concerned with equipment failures. For example, one survey found that gearbox failures account for 34% of all failure modes (such as fatigue) in aircraft. Another survey revealed that gearbox failures account for 15% of all failures in a certain industry. Equipment failures typically result in lost revenues due to plant downtime. Accordingly, detecting potential failures (such as faults) in a gearbox or other equipment at an early stage can assist in preventing secondary damage, save maintenance costs, improve plant uptimes, reduce potential financial losses from plant downtime, and assist towards increasing productivity.

Monitoring the health of equipment is typically a time-consuming process in which a specialist custom builds a model for each asset. The specialist often specifies where to install monitoring points on the equipment, specifies how one or more sensors should be mounted, and enters the installed points in modeling software. This process allows extremely precise models to be built, which are specific to particular assets. This also allows for health monitoring hardware and wiring to be optimized.

Since this process is performed separately on each piece of equipment, however, the process is very time-consuming and costly. Even with improvements in modeling and wireless communication technologies, modeling an asset typically remains costly and can discourage the adoption of monitoring equipment on a wide scale basis.

SUMMARY

This disclosure provides a system and method for asset-specific equipment health monitoring (EHM) for industrial equipment using standardized asset models.

In a first embodiment, an apparatus includes at least one input interface configured to receive at least one input signal associated with an asset, where the asset includes a piece of equipment. The apparatus also includes at least one processing unit operable to be pre-configured to identify a specified fault in the asset using the at least one input signal and an asset-specific model that includes a combination of standard subsystem models. The apparatus further includes at least one output interface configured to provide an indicator identifying the fault.

In a second embodiment, a system includes at least one sensor and an equipment health monitoring (EHM) unit. The at least one sensor is configured to measure one or more characteristics of an asset, where the asset includes a piece of equipment. The EHM unit includes at least one sensor interface configured to receive at least one input signal associated with the asset from the at least one sensor. The EHM unit also includes at least one processing unit operable to be pre-configured to identify a specified fault in the asset using the at least one input signal and an asset-specific model that includes a combination of standard subsystem models. The EHM unit further includes at least one output interface configured to provide an indicator identifying the fault.

In a third embodiment, a method includes pre-configuring an equipment health monitoring (EHM) unit with an asset-specific model that includes a combination of standard subsystem models that model an asset, where the asset includes a piece of equipment. The method also includes receiving at least one input signal having measurement data associated with the asset. The method further includes analyzing the at least one input signal to determine if a specified fault has occurred and outputting an indicator identifying the specified fault when it is determined that the specified fault has occurred.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
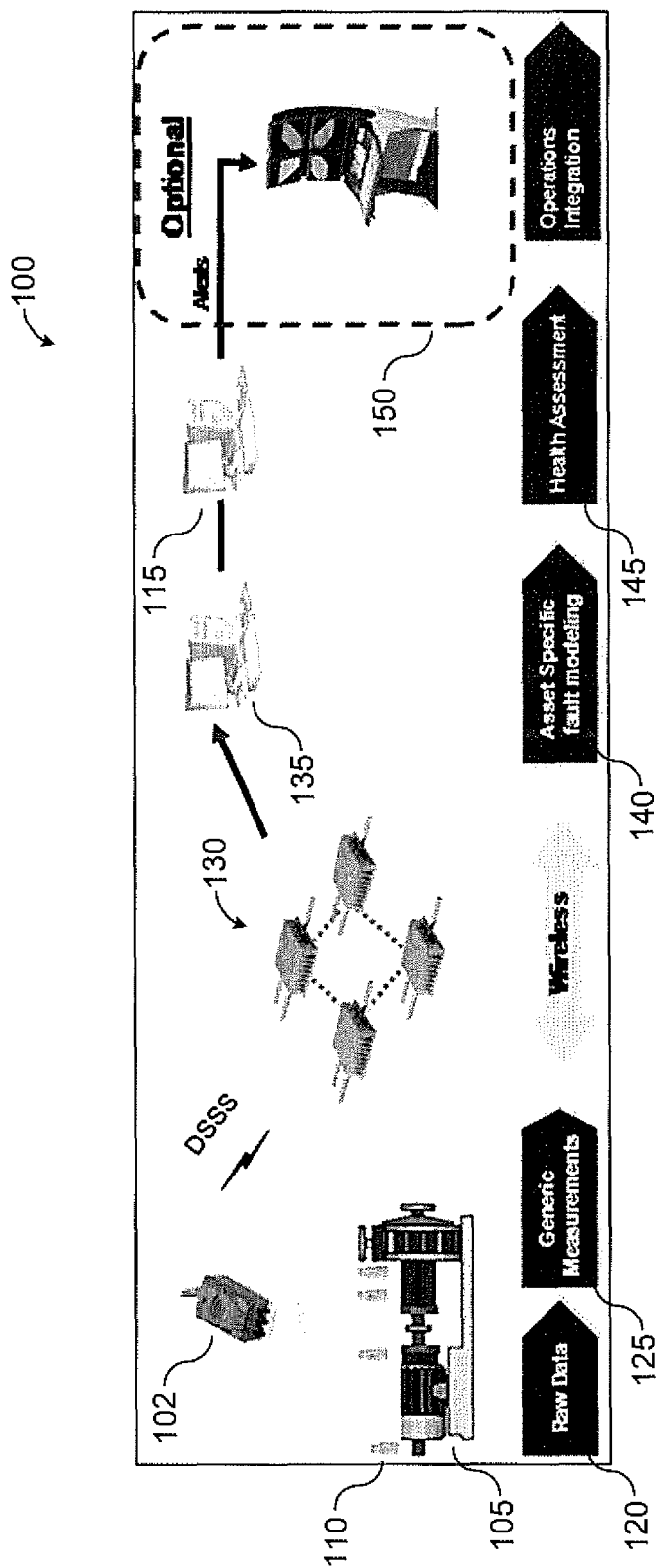
FIG. 1 illustrates an example custom-built equipment health monitoring (EHM) system.

FIG. 1 illustrates an example custom-built equipment health monitoring (EHM) 100 system. In the example shown in FIG. 1, an EHM unit 102 monitors industrial equipment 105. One or more sensors 110 measure one or more characteristics of the industrial equipment 105. The EHM unit 102 is generic hardware, meaning the same EHM unit 102 can be utilized for a variety of different types of industrial equipment 105. A specialist can determine a deployment location for the EHM unit 102 so that the EHM unit 102 is located near a target asset, and the EHM unit 102 can receive measurements from the sensors 110. The EHM unit 102 then sends generic measurements to analysis software 115. The specialist typically designs and builds asset-specific models corresponding to the specific industrial equipment 105, and the analysis software 115 uses those models to analyze the data from the EHM unit 102. The specialist often builds the asset models in software based on the specific assets (industrial equipment 105) and the specific fault(s) that a customer wants to monitor.

In FIG. 1, the EHM unit 102 transfers the generic measurements to the analysis software 115. However, the EHM unit 102 is not aware of the specific asset being monitored or the faults for which the EHM unit 102 is being used to detect. The EHM unit 102 simply receives raw data 120 from the sensors 110 and outputs the raw data 120 as generic measurements 125. The EHM unit 110 sends the generic measurements 125 via a wired or wireless network 130 to a processing server 135, which can execute the analysis software 115 with custom-built asset models. The processing server 135 performs asset-specific fault modeling 140 using the asset models to generate a health assessment 145 of the industrial equipment 105. Thereafter, one or more alerts can optionally be triggered and provided to a user interface 150.

As noted above, setup of the system 100 typically requires the use of a specialist to place the sensors 110 on or around the industrial equipment 105 and to generate the asset-specific models used by the analysis software 115. As a result, it is often costly and time consuming to set up and maintain the system 100.

Figure 2:
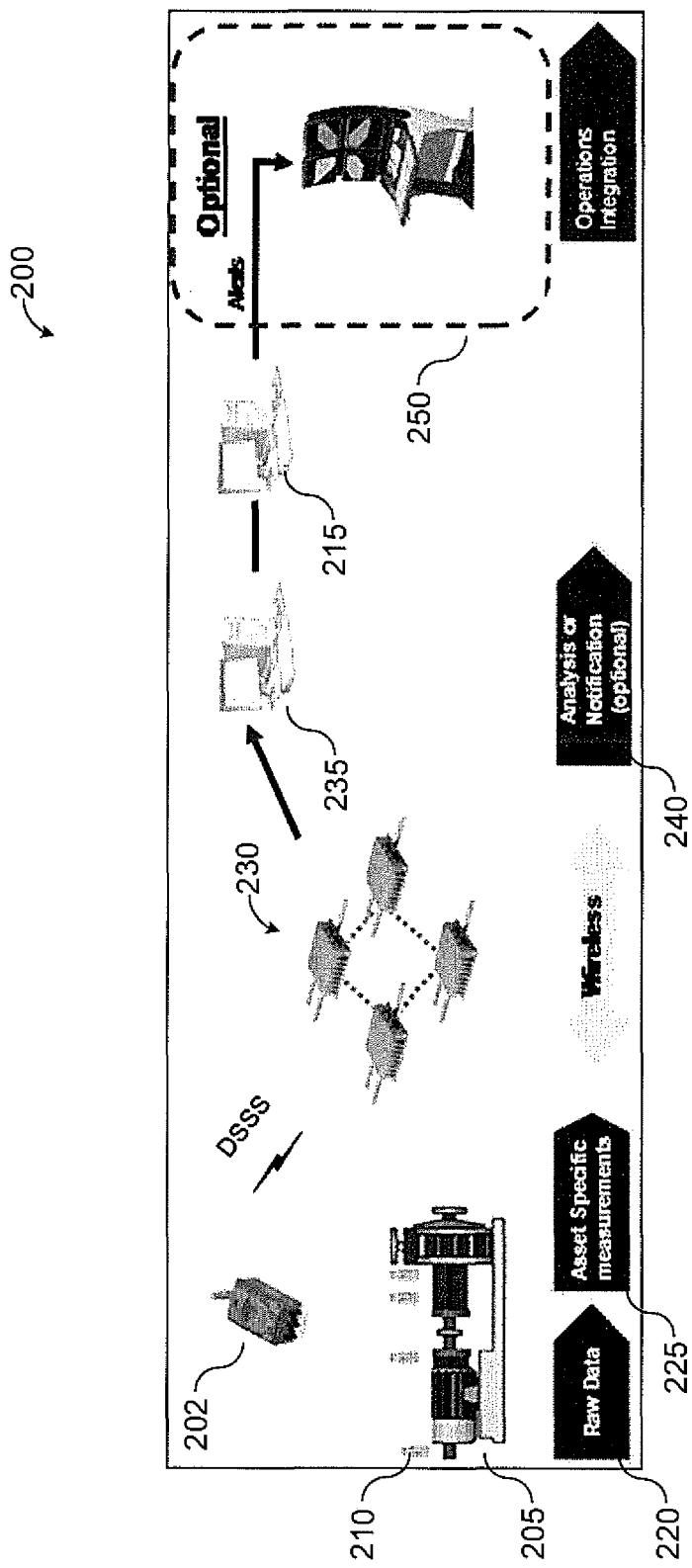
FIG. 2 illustrates an example asset-specific EHM system using standardized asset models according to this disclosure.

FIG. 2 illustrates an example asset-specific EHM system 200 using standardized asset models according to this disclosure. In this example, the system 200 includes an advanced EHM (AEHM) unit 202, industrial equipment 205, and one or more sensors 210. The industrial equipment 205 includes any suitable piece(s) of equipment used to perform at least one physical operation in an industrial processing or production facility. The industrial equipment 205 could include rotating equipment, such as a gearbox, a pump system having an impeller, or other rotating components. Each of the sensors 210 includes any suitable structure for measuring one or more characteristics of the industrial equipment 205, such as vibration, motor current, noise, speed, or other characteristic(s). In some embodiments, one or more of the sensors 210 are accelerometers, and the sensors 210 can capture spectral or time waveform-based measurements.

The AEHM unit 202 is pre-configured to detect specific faults according to the specific type of equipment to be monitored. In other words, rather than outputting generic measurements, the AEHM unit 202 performs various processing operations using raw data 220 to generate asset-specific measurements 225. As a particular example, the AEHM unit 202 could be configured to detect gear wear in a gearbox, and the AEHM unit 202 can include processing to perform monitoring as disclosed in U.S. patent application Ser. No. 12/417,475; U.S. patent application Ser. No. 12/417,452; and U.S. patent application Ser. No. 12/503,783 (all of which are hereby incorporated by reference).

The AEHM unit 202 includes one or more standardized asset models for assets to be monitored. In some embodiments, through processing techniques and the use of embedded software, the AEHM unit 202 uses built-in asset specific models to model and identify various faults. Also, in some embodiments, the AEHM unit 202 can communicate over both wired and wireless networks 230 and is adapted for use with multiple types of industrial equipment 205, such as pumps, compressors, turbines, fans, motors, agitators, and fixed equipment like transformers. The embedded models use subsystem modeling-based methodology, where the embedded models are used to build an asset-specific model by a combination of subsystem models.

In some embodiments, the AEHM unit 202 can be pre-configured to monitor faults of a specific type of asset or for a specific asset. The AEHM unit 202 then receives raw data 220 from the one or more sensors 210, processes the raw data 220 using the embedded software to detect specific faults, and outputs the measurements 225. For example, the AEHM unit 202 may perform an FFT analysis to detect a specific fault corresponding to a particular type of equipment, such as gear wear in a gearbox. The AEHM unit 202 then outputs the asset-specific measurements 225, which can include information that indicates the presence or absence of a fault and other information about any detected fault. The measurements 225 can be sent to a processing device 235 or other remote device for further analysis. The processing device 235 could represent any suitable computing device or other processing device, such as a desktop, laptop, or server computer having one or more processors, one or more memories, and one or more network interfaces.

The processing device 235 could execute analysis software 215 or otherwise make the measurements 225 available to the analysis software 215. The analysis software 215 could analyze the asset-specific measurements and identify any faults, at which point the analysis software 215 could trigger an alarm to a user interface 250, such as a distributed control system (DCS) or OLE for Process Control (OPC) interface. The analysis software 215 may not require the use of asset-specific models since the AEHM unit 202 performs subsystem modeling of the specific industrial equipment 205. As a result, the analysis software 215 could simply check whether the AEHM unit 202 has detected a problem and raise an alarm if necessary.

Although FIG. 2 illustrates one example of an asset-specific EHM system 200 using standardized asset models, various changes may be made to FIG. 2. For example, the system 200 could include any number of AEHM units 202, equipment 205, sensors 210, networks 230, processing devices 235, analysis software 215, and user interfaces 250. Also, the functional division shown in FIG. 2 is for illustration only. Various components in FIG. 2 could be combined, further subdivided, or omitted and additional components could be added according to particular needs. As a specific example, the analysis software 215 could be combined with the processing device 235 or the user interface 250, or the analysis software 215 could be executed closer to the industrial equipment 205.

Figure 3:
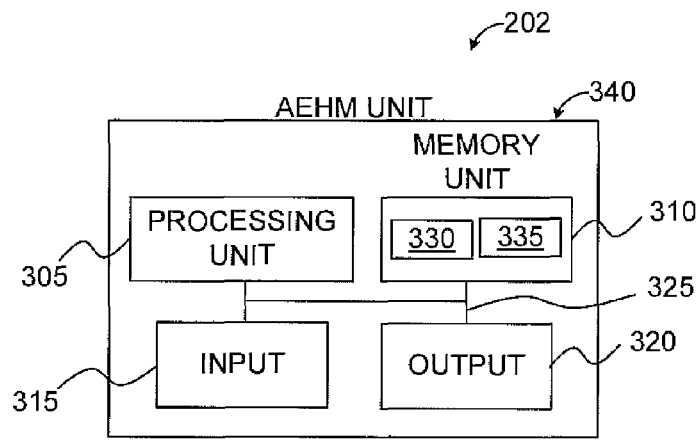
FIG. 3 illustrates an example advanced equipment health monitoring (AEHM) unit according to this disclosure.

FIG. 3 illustrates an example AEHM unit 202 according to this disclosure. In FIG. 3, the AEHM unit 202 can be formed using any device capable of receiving, processing, and transmitting signals via wireless and/or wired communication links. The AEHM unit 202 in this example includes at least one processing unit 305, at least one memory unit 310, at least one input unit 315, and at least one output unit 320. The processing unit 305 includes any suitable processing device(s), such as a microprocessor, digital signal processor, field programmable gate array, or application specific integrated circuit. The memory unit 310 includes any suitable volatile and/or non-volatile storage and retrieval device(s). The input unit 315 includes any suitable structure(s) for receiving input data, such as one or more sensor interfaces for receiving data from one or more sensors 210. The output unit 320 includes any suitable structure(s) for providing output data, such as a wireless interface or one or more Ethernet or other wired network interfaces. The components 305-320 can be interconnected by one or more communication links 325 (such as a bus).

It is understood that the AEHM unit 202 may be configured differently and that each of the listed components 305-325 may actually represent several different components. For example, the processing unit 305 may represent a multi-processor processing system or a distributed processing system, and the memory unit 310 may include different levels of cache memory, main memory, hard disks, and remote storage locations (each of which can be fixed or removable). The input unit 315 may also include touch screens, keyboards, and the like.

The memory unit 310 in this example includes analysis software 330 or other code for execution by the processing unit 305, where the analysis software 330 can analyze the raw data 220 and generate the measurements 225. The analysis software 330 can use models 335, which include embedded subsystem models that are combined in order to build an asset-specific model. As a particular example, a pump system can be modeled using an impeller model, a shaft model, a bearings model, and a motor model. The combination of subsystem models that are used to create an asset-specific model can be defined in any suitable manner, such as by personnel familiar with the industrial equipment 205 (but who do not require specialized expertise in order to create the asset-specific model).

The AEHM unit 202 further includes a housing 340 configured to contain the other components 305-325. Note that portions of the input unit 315 and output unit 320 could be contained within the housing 340, while other portions are accessible from outside of the housing 340. The housing 340 can be dimensioned and constructed to be coupled to or placed near an asset to be monitored.

Although FIG. 3 illustrates one example of an AEHM unit 202, various changes may be made to FIG. 3. For example, while the AEHM unit 202 is shown using a processing unit 305 and a memory unit 310 that includes program code, other embodiments of the AEHM unit 202 could be used. As a specific example, the AEHM unit 202 could be implemented with fixed or programmable logic configured to perform the techniques described above.

Figure 4:
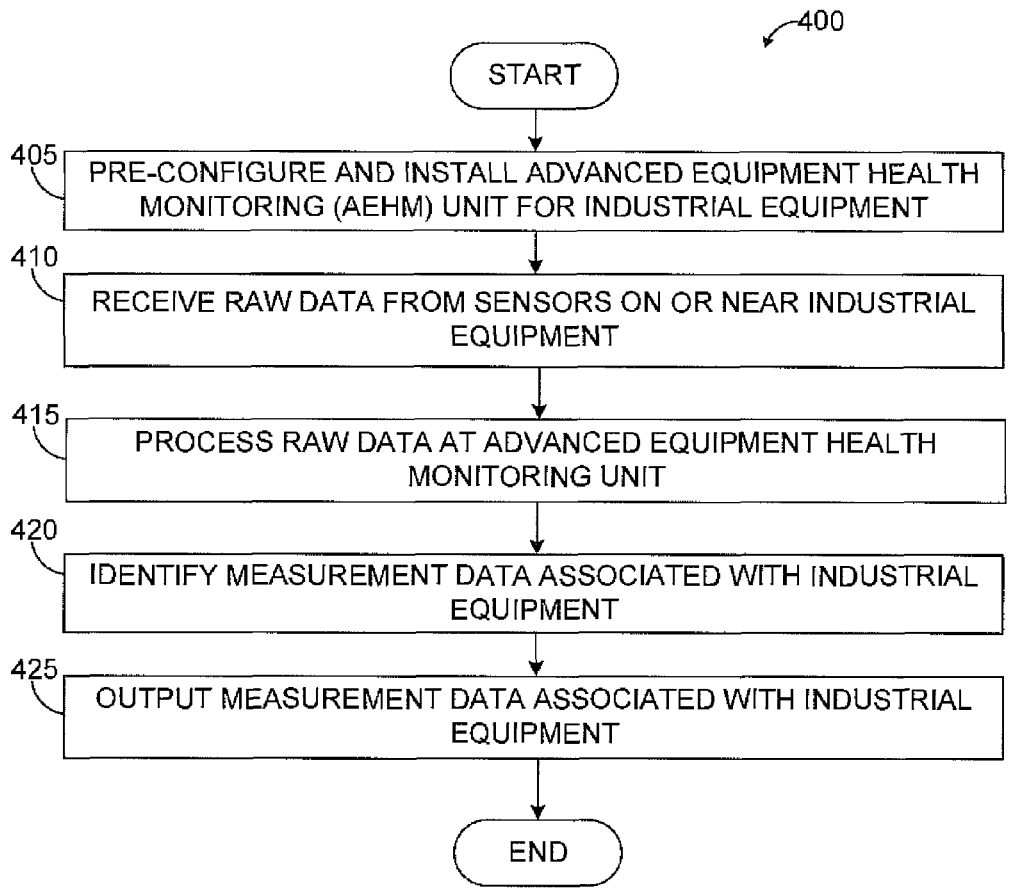
FIG. 4 illustrates an example process for asset-specific EHM for industrial equipment using standardized asset models according to this disclosure.

FIG. 4 illustrates an example process 400 for asset-specific EHM for industrial equipment using standardized asset models according to this disclosure. As shown in FIG. 4, an AEHM unit is pre-configured and installed for specific industrial equipment at step 405. The pre-configuration could include, for example, adding custom routines to firmware of the AEHM unit 202 to enable the EHM unit 202 to specialize in monitoring faults of a certain type of asset or for a certain asset. This pre-configuration can be done at any suitable time, such as on the manufacturer's factory floor when the EHM unit 202 is created or at a distribution center. The pre-configured EHM unit 202 can then be deployed on or near the asset.

Once the EHM unit is installed, the EHM unit can start monitoring for the specific faults, possibly as soon as the unit is turned on. At that point, the EHM unit receives raw data from one or more sensors on or near the industrial equipment at step 410, processes the raw data at step 415, and generates asset-specific measurements at step 420. As noted above, this could include the EHM unit 202 performing FFT or other processing, which is based on the customization of the EHM unit 202. At that point, the asset-specific measurements can be output at step 425, such as by transmitting the measurements over a wired or wireless connection to an intended destination.

Utilizing the AEHM unit 202, configuration time can be greatly reduced, saving both time and money. The AEHM unit 202 can also utilize standard fault models for standard assets, and dedicated external analysis software 215 may not be required. For instance, by pre-configuring the AEHM unit 202, a specialist is not required to custom-build an application to analyze the measurement data, yet the AEHM unit 202 can still be optimized to monitor certain faults.

Although FIG. 4 illustrates one example of a process 400 for asset-specific EHM for industrial equipment using standardized asset models, various changes may be made to FIG. 4. For example, various steps in FIG. 4 could overlap, occur in parallel, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
at least one input interface configured to receive at least one input signal associated with an asset, the asset comprising a piece of equipment;
at least one processing unit operable to be pre-configured to identify a specified fault in the asset using the at least one input signal and an asset-specific model that comprises a combination of standard subsystem models, wherein the fault represents damage to the asset; and
at least one output interface configured to provide an indicator identifying the fault.

2. The apparatus of claim 1, further comprising:
a housing configured to hold the at least one input interface, the at least one processing unit, and the at least one output interface.

3. The apparatus of claim 1, further comprising:
at least one memory unit configured to store the asset-specific model.

4. The apparatus of claim 1, wherein the standard subsystem models comprise standardized fault models configured to identify faults for standard assets.

5. The apparatus of claim 1, wherein the at least one input signal comprises raw data from at least one sensor.

6. The apparatus of claim 1, wherein the at least one output interface is configured to transmit the indicator identifying the fault to a remote device via a wireless interface.

7. The apparatus of claim 1, wherein the asset comprises one of: a pump, a compressor, a turbine, a fan, a motor, an agitator, and a transformer.

8. A system comprising:
- at least one sensor configured to measure one or more characteristics of an asset, the asset comprising a piece of equipment; and
- an equipment health monitoring (EHM) unit comprising:
  - at least one sensor interface configured to receive at least one input signal associated with the asset from the at least one sensor;
  - at least one processing unit operable to be pre-configured to identify a specified fault in the asset using the at least one input signal and an asset-specific model that comprises a combination of standard subsystem models, wherein the fault represents damage to the asset; and
  - at least one output interface configured to provide an indicator identifying the fault.

9. The system of claim 8, wherein the EHM unit further comprises a housing configured to hold the at least one input interface, the at least one processing unit, and the at least one output interface.

10. The system of claim 8, wherein the EHM unit further comprises at least one memory unit configured to store the asset-specific model.

11. The system of claim 8, wherein the standard subsystem models comprise standardized fault models configured to identify faults for standard assets.

12. The system of claim 8, wherein the at least one output interface is configured to transmit the indicator identifying the fault to a remote device via a wireless interface.

13. The system of claim 8, wherein the asset comprises one of: a pump, a compressor, a turbine, a fan, a motor, an agitator, and a transformer.

14. The system of claim 8, wherein the EHM unit further comprises at least one memory unit configured to store software or firmware instructions executed by the at least one processing unit, the software or firmware instructions configured to identify the specified fault in the asset using the at least one input signal.

15. The system of claim 8, wherein the at least one sensor comprises at least one accelerometer.

16. A method comprising:
- pre-configuring an equipment health monitoring (EHM) unit with an asset-specific model that comprises a combination of standard subsystem models that model an asset, the asset comprising a piece of equipment;
- receiving at least one input signal comprising measurement data associated with the asset;
- analyzing the at least one input signal to determine if a specified fault has occurred wherein the fault represents damage to the asset; and
- outputting an indicator identifying the specified fault when it is determined that the specified fault has occurred.

17. The method of claim 16, wherein outputting the indicator comprises wirelessly transmitting the indicator to a remote device.

18. The method of claim 17, further comprising:
- wirelessly transmitting additional asset-related information along with the indicator.

19. The method of claim 16, wherein the standard subsystem models comprise standardized fault models configured to identify faults for standard assets.

20. The method of claim 16, wherein the asset comprises one of: a pump, a compressor, a turbine, a fan, a motor, an agitator, and a transformer.

* * * * *